No. 613,753. Patented Nov. 8, 1898.
W. T. BRANITZKY.
BICYCLE GEARING.
(Application filed Sept. 30, 1897.)
(No Model.)
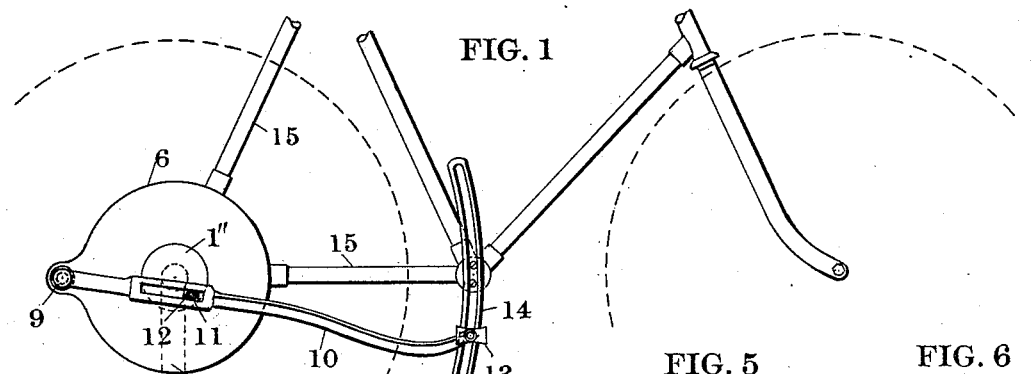
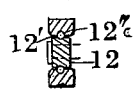
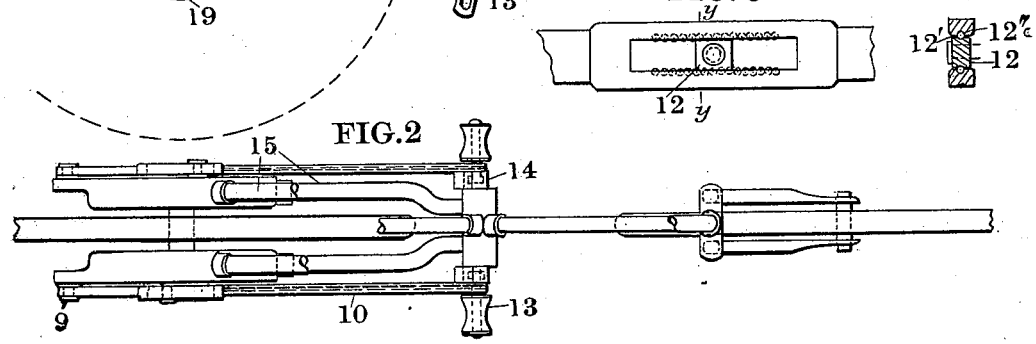
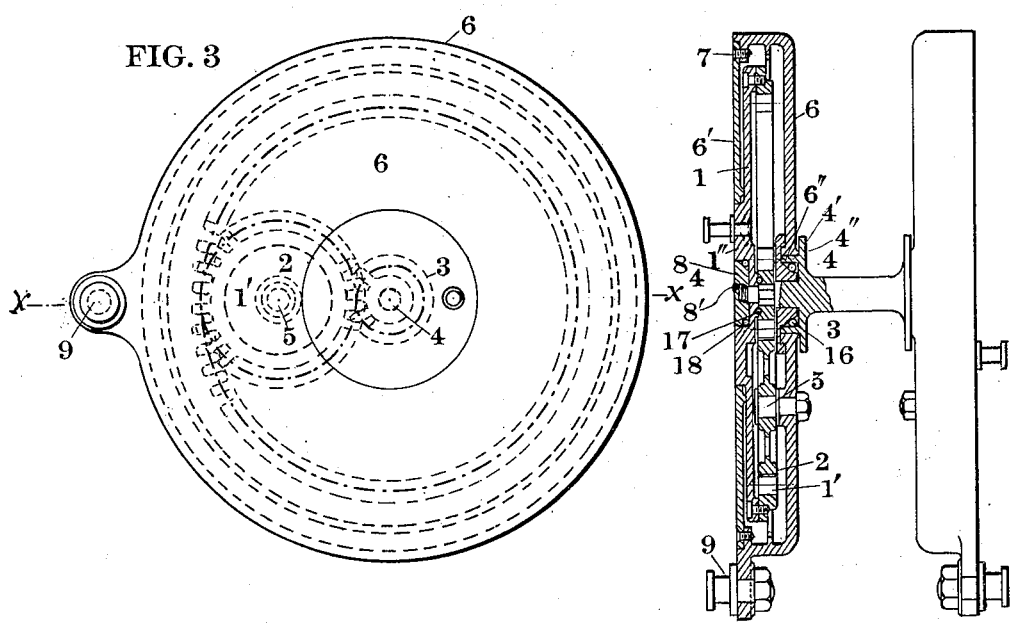
WITNESSES
Hermann Heinz
William Henderson
INVENTOR
William T. Branitzky,
BY Alfred Metzger,
his ATT'Y

UNITED STATES PATENT OFFICE.

WILLIAM T. BRANITZKY, OF CHICAGO, ILLINOIS.

BICYCLE-GEARING.

SPECIFICATION forming part of Letters Patent No. 613,753, dated November 8, 1898.

Application filed September 30, 1897. Serial No. 653,545. (No model.)

*To all whom it may concern:*

Be it known that I, WILLIAM T. BRANITZKY, a citizen of the United States, residing at Chicago, in the county of Cook and State of Illinois, have invented a new and useful Improvement in Bicycle Gearing and Propelling Mechanism, of which the following is a specification.

My invention relates to bicycle gearing and propelling mechanism, and has particular reference to an improved arrangement of gearing adapted for lever propulsion. Its objects are, first, to provide an improved chainless gearing; second, to arrange same in compact form, and, third, to center same at the axle of the rear wheel, whereby the axle may be used as a bearing for the driver. I accomplish these objects by the construction illustrated in the accompanying drawings, in which—

Figure 1 is a side elevation of part of a bicycle embodying my invention. Fig. 2 is a top plan of same. Fig. 3 is an enlargement of the casing 6 and gearing therein from the same view as shown in Fig. 1, the pitch-lines and circumference of the wheels being indicated by the dotted lines. Fig. 4 is a horizontal section of Fig. 3 on the line $x\,x$, showing also the outline of the casing on the other end of the axle of the rear wheel. Fig. 5 is an enlarged detail view of part of the bearing in the lever for the crank-pin 11, from the same view as shown in Fig. 1; and Fig. 6 is a vertical section of same on the line $y\,y$.

The main parts shown in Fig. 1 are the casing 6, supported by the axle of the rear wheel and by the tubing 15. At the rear end of the casing is the fulcrum 9 for the lever 10. The lever has a longitudinal slot therein, serving as a bearing for the crank-pin 11 on the driver 1. The free end of the lever is provided with a pedal 13 and is preferably connected with a guide 14 to prevent the lever from being strained outwardly.

The driver, as will be seen by reference to Figs. 3 and 4, is an internal gear-wheel running on the axle 4 of the rear wheel of the bicycle. In the form shown the driver consists of a plate 1, having the internal gear-teeth riveted to its inner side near the circumference. Within this is the intermediate wheel 2 on the axle 5, which is supported by the back wall of the casing. The axle 4 of the rear wheel of the bicycle is journaled in the casing and has the pinion 3 rigidly mounted thereon. The axle 4 has a flange 4' thereon, to which the spokes of the wheel are secured, the wheel being rigidly mounted upon its axle. A flange 4" projects into the casing from the flange 4'. The cone 6" is threaded to the casing. The axle 4 is reduced at the part where the pinion 3 is secured, forming a shoulder which holds the pinion free from the cone 6". Outside of the pinion the driver 1 is journaled upon the axle. At the end of the axle a nut or cone 8 is threaded to same and locked thereto by the screw 8'. A section 19 of the casing 6, (indicated by dotted lines in Fig. 1,) is removable to provide for the insertion and removal of the axle.

In securing the parts together the axle is first inserted in the casing. The section 19 is then put into its proper position. The cone 6" is then screwed into the casing after the insertion of the balls 16, the cone serving also to hold the section 19 in its proper place. The pinion is then adjusted upon the axle against the shoulder formed therefor, the pinion being feathered or keyed upon the axle. The balls 17, driver, balls 18, and cone 8 are then successively put into their respective places. The plate 6' is then secured to the casing 6, thus forming a substantially-closed casing.

The driver 1 has an annular projection 1", extending to the outside of the casing and having thereon a pin 11. As will be seen by reference to Figs. 5 and 6, the pin 11 has pivotally mounted thereon a block 12, having grooves 12' therein for contact with the balls 12", which are supported in an upper and lower row in the lever-slot and partly exposed toward the path of the block. This construction, while providing a sliding longitudinal movement, prevents a relative lateral movement of the block and the lever and also prevents a frictional contact between same. The lever is so operated that the pin will move downwardly toward the rear of the slot on the downward stroke of the lever, thus carrying the driver in the direction indicated by the arrow. The intermediate wheel 2, meshing with the internal teeth on the driver, revolves in the same direction and drives the pinion 3, together with the bicycle-wheel, in the opposite direction, as indicated by the arrow.

As indicated by Figs. 2 and 4, the hereinbefore-described mechanism is duplicated on the opposite side of the bicycle.

It is plain that the form of the bearings in the casing, as well as the sliding-lever connection with the pin 11, may be altered without departing from the spirit of my invention.

What I claim as my invention, and desire to secure by Letters Patent, is—

1. The combination of a bicycle-frame; a casing secured to the rear fork, and having an annular opening; a bicycle-wheel having its axle journaled in the casing; a pinion on said axle; an intermediate gear-wheel journaled in the casing; and meshing with said pinion; an internal gear-wheel journaled on said axle, and meshing with the intermediate gear-wheel, and having a pin projecting through said annular opening; and an arm providing a bearing for said pin, whereby and through said gear-wheels, said bicycle-wheel is propelled, substantially as described.

2. The combination of a bicycle-frame; a casing secured to the rear fork, and having an annular opening; a bicycle-wheel having its axle journaled in the casing; a pinion on said axle; an intermediate gear-wheel journaled in the casing and meshing with said pinion; an internal gear-wheel journaled on said axle, and meshing with the intermediate gear-wheel, and having an annular projection extending through said annular opening to the outside of the casing; a pin secured to said projection; and an arm providing a bearing for said pin, whereby and through said gear-wheels, said bicycle-wheel is propelled, substantially as described.

WILLIAM T. BRANITZKY.

Witnesses:
ALFRED MELTZER,
WM. R. RUMMLER.